United States Patent
Mata (10) Patent No.: US 10,424,327 B1
(45) Date of Patent: Sep. 24, 2019

(54) HEAD SUSPENSION ASSEMBLY FOR TESTING A SLIDER

(71) Applicant: Seagate Technology LLC, Cupertino, CA (US)

(72) Inventor: Sunchai Mata, Nakorn Ratchasima (TH)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/913,327

(22) Filed: Mar. 6, 2018

(51) Int. Cl.
*G11B 5/48* (2006.01)

(52) U.S. Cl.
CPC .......... *G11B 5/4826* (2013.01); *G11B 5/4833* (2013.01); *G11B 5/4853* (2013.01)

(58) Field of Classification Search
CPC .... G11B 5/4826; G11B 5/4853; G11B 5/4833
See application file for complete search history.

(56) References Cited

U.S. PATENT DOCUMENTS

| | | | | |
|---|---|---|---|---|
| 5,873,159 A * | 2/1999 | Arya | ............ | G11B 5/4853 29/603.03 |
| 6,459,260 B1 | 10/2002 | Bonin et al. | | |
| 6,903,543 B2 | 6/2005 | Boutaghou et al. | | |
| 7,518,814 B2 * | 4/2009 | Umezaki | ............ | G11B 5/012 360/31 |
| 8,134,804 B2 * | 3/2012 | Honzawa | ............ | G11B 5/455 360/245.3 |
| 8,169,746 B1 * | 5/2012 | Rice | ............ | G11B 5/486 360/245.9 |
| 8,379,349 B1 * | 2/2013 | Pro | ............ | G11B 5/486 360/245.9 |
| 8,477,459 B1 * | 7/2013 | Pan | ............ | G11B 5/4833 360/245.9 |
| 8,553,364 B1 * | 10/2013 | Schreiber | ............ | G11B 5/486 360/245.9 |
| 8,861,140 B1 * | 10/2014 | Chen | ............ | G11B 5/4826 360/234.6 |
| 9,036,303 B2 * | 5/2015 | Teng | ............ | G11B 5/486 360/245.9 |
| 10,043,541 B1 * | 8/2018 | Dunn | ............ | G11B 5/4853 |
| 2002/0075602 A1 * | 6/2002 | Mangold | ............ | G11B 5/4826 360/245.7 |
| 2005/0099733 A1 * | 5/2005 | Hagen | ............ | G11B 5/486 360/245.7 |
| 2006/0236527 A1 * | 10/2006 | Davis | ............ | G11B 5/4826 29/603.12 |
| 2007/0002494 A1 * | 1/2007 | Takahashi | ............ | G11B 5/4826 360/234.6 |
| 2007/0137024 A1 * | 6/2007 | Yao | ............ | G11B 5/455 29/603.03 |
| 2007/0263325 A1 * | 11/2007 | Hanya | ............ | G11B 5/4826 360/245.3 |

(Continued)

*Primary Examiner* — Brian E Miller
(74) *Attorney, Agent, or Firm* — Westman, Champlin & Koehler, P.A.

(57) ABSTRACT

A head suspension assembly for testing a slider. The head suspension assembly includes a load beam assembly and a gimbal coupled to the load beam assembly. A clamp is coupled to the gimbal. The clamp is configured to releasably secure a slider in the head suspension assembly. The clamp includes an alignment feature for positioning the slider in the head suspension assembly.

20 Claims, 11 Drawing Sheets

(56) References Cited

U.S. PATENT DOCUMENTS

| | | | |
|---|---|---|---|
| 2009/0251825 A1* | 10/2009 | Honzawa | G11B 5/455 |
| | | | 360/245.3 |
| 2013/0176646 A1* | 7/2013 | Arai | G11B 5/486 |
| | | | 360/245.8 |
| 2013/0271874 A1* | 10/2013 | Miura | G11B 5/486 |
| | | | 360/234.3 |
| 2019/0130938 A1* | 5/2019 | Weissner | G11B 5/455 |

* cited by examiner

HEAD SUSPENSION ASSEMBLY FOR TESTING A SLIDER

SUMMARY

In one embodiment, a head suspension assembly is provided. The head suspension assembly includes a load beam assembly and a gimbal coupled to the load beam assembly. A clamp is coupled to the gimbal. The clamp is configured to releasably secure a slider in the head suspension assembly. The clamp includes an alignment feature for positioning the slider in the head suspension assembly.

In another embodiment, an apparatus includes a load beam assembly and a gimbal coupled to the load beam assembly. The gimbal includes a stopper. A clamp is coupled to the gimbal. The clamp is configured to releasably secure a slider and to urge the slider towards the stopper.

In yet another embodiment, a method of making a head suspension assembly is provided. The method includes providing a load beam assembly, and coupling a gimbal to the load beam assembly. The method further includes coupling a clamp to the gimbal. The clamp is capable of releasably securing a slider in the head suspension assembly. The method also includes providing an alignment feature in the clamp for positioning the slider in the head suspension assembly.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments of the disclosure generally relate to testing components of a data storage device during manufacture of the data storage device. A disc drive is one example of a data storage device. In a disc drive, data is stored on a storage disc in concentric tracks. In many drives, the data is stored using a write head that changes a physical property of the disc. The data is read from the disc by positioning a read head over a desired track and sensing the physical properties of the disc along the track. For example, in a magnetic disc drive, the read head senses magnetic moment boundaries along the disc.

The process for producing a read head or a write head varies depending upon the type of read head or write head being produced. Nonetheless, substantially all head manufacturing methods share common characteristics, such as high degree of manufacturing complexity, small feature sizes, and a susceptibility to manufacturing errors. Because of this, each production method generates some heads that may not meet specifications. In order to detect faulty heads accurately, the transducing heads are tested over a disc surface. In particular, each transducing head is flown over a disc surface while it performs writing and/or reading operations. Early in the disc drive manufacturing art, this type of testing was performed after the head was assembled in a complete disc drive. However, this in-drive testing proved to be costly because the disc drive had to be rebuilt if the head was found to be faulty.

To address the cost of in-drive testing, a "spin-stand" which allowed a head-gimbal assembly (HGA) to be tested before it was placed in a disc drive was developed. An HGA includes a slider having a transducing head, an armature (beam and gimbal strut) for positioning the slider, and a flexible circuit that carries electrical signals between the head and drive electronics. In general, a spin-stand includes a spinning computer disc and a mounting support that supports the HGA and moves the transducing head to a desired position over the spinning disc. The transducer is substantially more delicately fabricated that the other components of the HGA. The spin-stand allows a series of tests to be performed on the transducing head including, for example, error-rate testing, pulse width-fifty testing, track average amplitude testing and track scan testing. Often, the failure of the HGA is due to the electrical malfunctioning of the transducer. Since the components of the HGA are permanently attached, the entire assembly is rejected if a transducer is found to be defective. Rejecting the entire assembly which includes the base plate, load beam, gimbal strut and flex circuit in addition to the slider with the embedded transducer is wasteful, unnecessarily increasing manufacturing costs.

In embodiments of the disclosure a head suspension assembly for a slider tester is provided, which includes a clamp that is coupled to a gimbal and a load beam. The assembly also includes an electrical interconnect, such as a flex circuit or other wiring. The clamp is configured to releasably secure a slider in the head suspension assembly such that the slider is electrically coupled to the electrical interconnect when properly positioned in the clamp.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Figure 1:
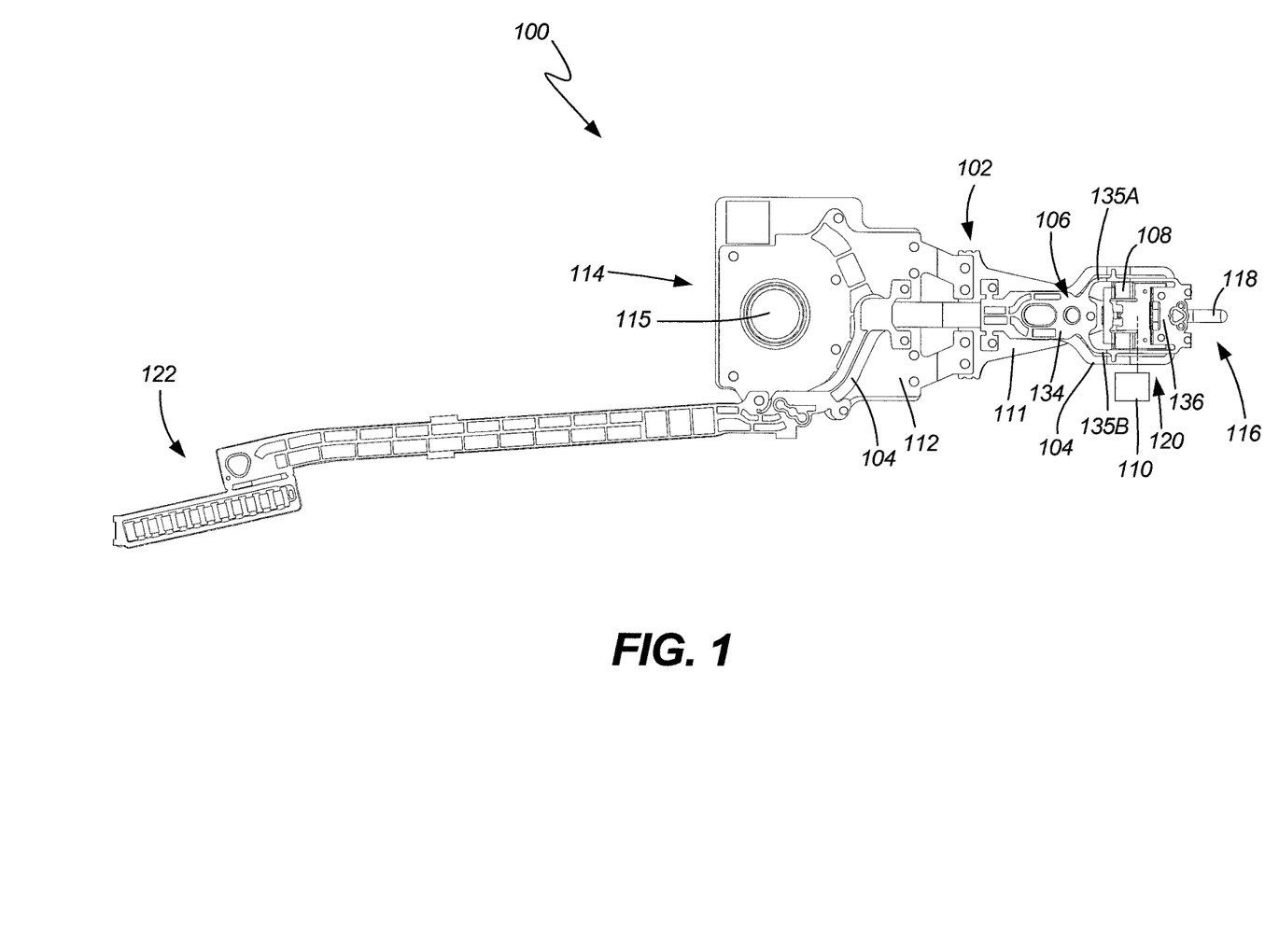
FIG. 1 is a top view of a head suspension assembly in accordance with one embodiment.

FIG. 1 is a top view of a head suspension assembly 100 in accordance with one embodiment. Head suspension assembly 100 includes a load beam assembly 102, an electrical interconnect (e.g., a flex circuit) 104, a gimbal 106 and a clamp 108 that releasably secures a slider 110 in the head suspension assembly 100. Load beam assembly 102 includes beam 111 and hinge 112. Load beam assembly 102 extends from a first end 114 that includes a mounting hole 115 to a second end 116 that includes a lift 118, which may be used to park the assembly 100 in a spin-stand tester. In some embodiments, load beam assembly 102 may be formed of stainless steel. Other suitable materials may also be used to form load beam assembly 102. As can be seen in FIG. 1, gimbal 106 includes a main body 134, a tongue 136 and legs 135A and 135B that connect main body 134 to tongue 136. Gimbal 106 may be formed of stainless steel or any other suitable material. In the embodiment of FIG. 1, a portion of clamp 108 may be attached or bonded to gimbal 106. Electrical interconnect 104 includes a slider side/slider end 120 and a tail side/tail end 122. The assembly of the head suspension 100 near the slider side 120 of the electrical interconnect 104 is somewhat complex, and is enlarged and illustrated in more detail in FIGS. 2A, 2B, 3B, etc.

Figure 2A:
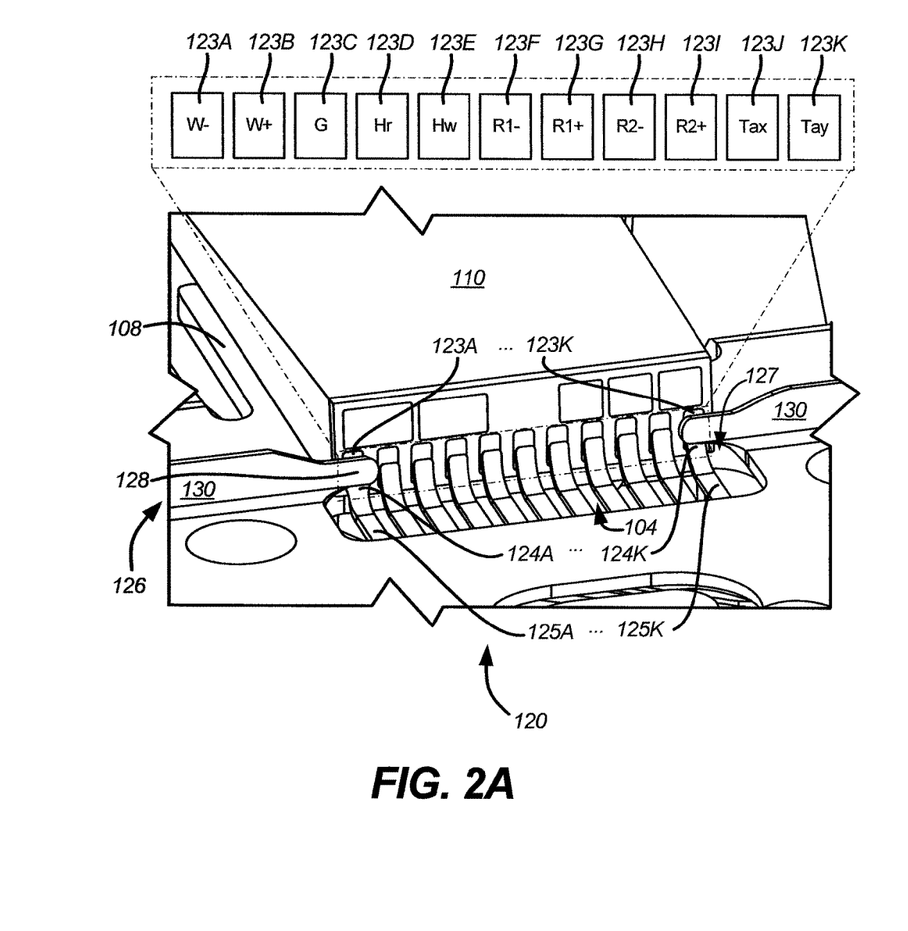
FIG. 2A is a diagrammatic illustration of an 11-pad slider electrically coupled to trace pads on a slider side of an electrical interconnect of the head suspension assembly of FIG. 1.

FIG. 2A is a diagrammatic illustration of an 11-pad slider 110 electrically coupled to trace pads on slider side 120 of electrical interconnect 104. In the embodiment of FIG. 2A, the 11 slider pads include a writer negative pad (W−) 123A, a writer positive pad (W+) 123B, a slider substrate connection pad or ground pad (G) 123C, a heater for reader pad (Hr) 123D, a heater for writer pad (Hw) 123E, a first reader negative pad (R1−) 123F, a first reader positive pad (R1+) 123G, a second reader negative pad (R2−) 123H, a second reader positive pad (R2+) 123I, a first thermal asperity detection pad (Tax) 123J, and a second thermal asperity detection pad (Tay) 123K. As can be seen in FIG. 2A, slider side 120 of electrical interconnect 104 includes contact pads 124A-124K that make electrical contact with respective ones of slider pads 123A-123K when slider 110 is held in place with the help of clamp 108. Contact pads 124A-124K are positioned at ends of traces 125A-125K, which can be seen through window 127 in gimbal 106. In one embodiment, a portion of clamp 108 (not shown in FIG. 2A) urges the slider 110 against a stopper 126 of gimbal 106. Stopper 126 may be substantially perpendicular to, or may generally extend in an upward direction from, a remaining portion of gimbal 106. In the embodiment of FIG. 2A, stopper 126 includes fingers 128 and wings 130 from which the fingers 128 extend. As can be seen in FIG. 2A, each of fingers 128 is in contact with at least one of pads 124A-124K (e.g., an outer pad) and helps prevent slider 110 from moving beyond the stopper 126 when the slider 110 is clamped.

Figures 2B, 2C:
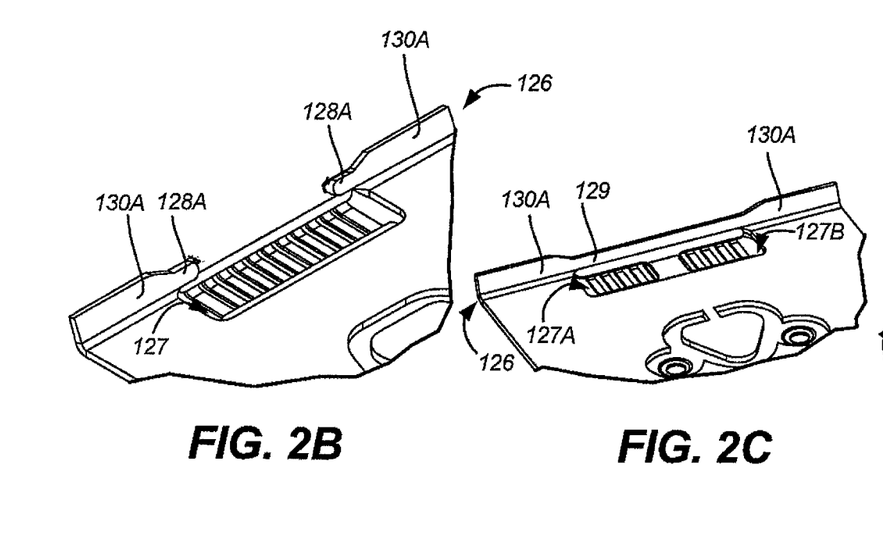
FIGS. 2B-2D are diagrammatic illustrations of example design variations in the portion of the head suspension assembly shown in FIG. 2A.
Figure 2D:
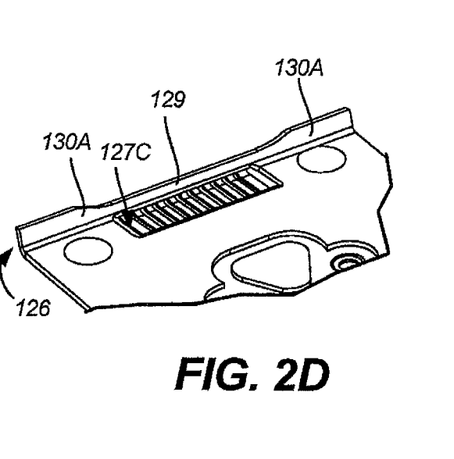

FIGS. 2B-2D are diagrammatic illustrations showing examples of variations in stopper 126 and window 127 designs in different embodiments. In the embodiment of FIG. 2B, wings 130A are extended in an upward direction relative to wings 130 of FIG. 2A. Further, in the embodiment of FIG. 2B, fingers 128A are shorter (e.g., extend less in a horizontal direction) relative to fingers 128 of FIG. 2A. The embodiment of FIG. 2C is similar to the embodiment of FIG. 2B in that it employs upwardly extended wing 130A. However, the embodiment of FIG. 2C includes a stopper bar 129 instead of fingers 128 (of FIG. 2A), 128A (of FIG. 2B). Further, in the embodiment of FIG. 2C, the single window (e.g., 127 of FIGS. 2A and 2B) is divided into two windows 127A and 127B. The embodiment of FIG. 2D has a stopper structure similar to that of the embodiment of FIG. 2C and therefore includes upwardly extended wings 130A and a stopper bar 129. However, the embodiment of FIG. 2D employs a relatively narrow window 127C compared to, for example, window 127 of the embodiment of FIG. 2A.

Figure 2E:
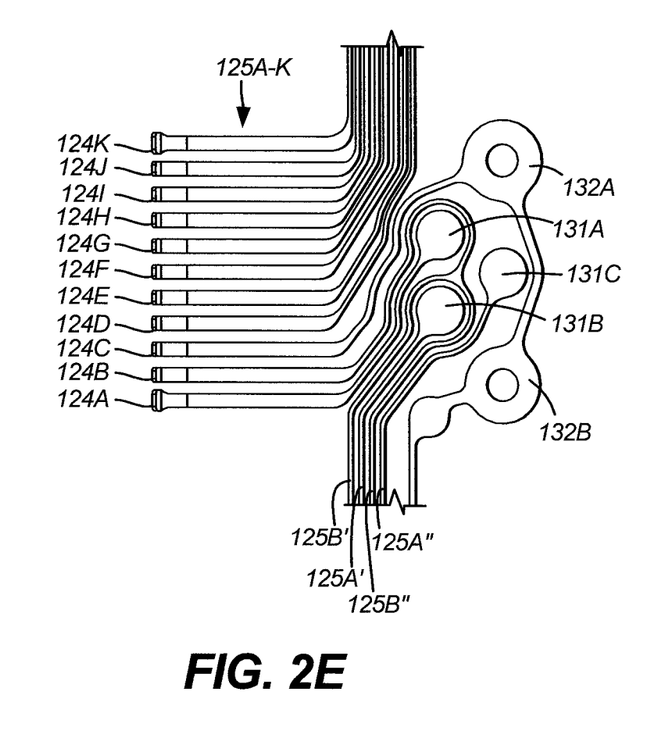
FIG. 2E is a top view of the slider side of the electrical interconnect showing portions of traces of the electrical interconnect.

FIG. 2E is a top view of slider side 120 of electrical interconnect 104 showing portions of traces 125A-125K below gimbal 106 (not shown in FIG. 2E). In one embodiment, the traces 125A-125K and pads 124A-124K are formed of copper. However, any other conductive material may also be used for the traces. Traces 125A-125K may be routed in any suitable manner. In the embodiment of FIG. 2E, the routing of traces 125D-125K is relatively simple (e.g., without any interleaving). However, the routing of traces 125A, 12B and 125C is carried out via additional structures 131A-131C, 132A and 132B. Structures 131A-131C help provide interleaved trace connections for electrical bandwidth improvement. In the embodiment of FIG. 2E, traces 125A and 125B and routed such that four trace portions are ultimately formed (e.g., trace portions 125A' and 125A" and trace portions 125B' and 125B"). Coupling of additional trace portions 125A' and 125A" is shown in FIG. 3A and discussed below.

Figure 3A:
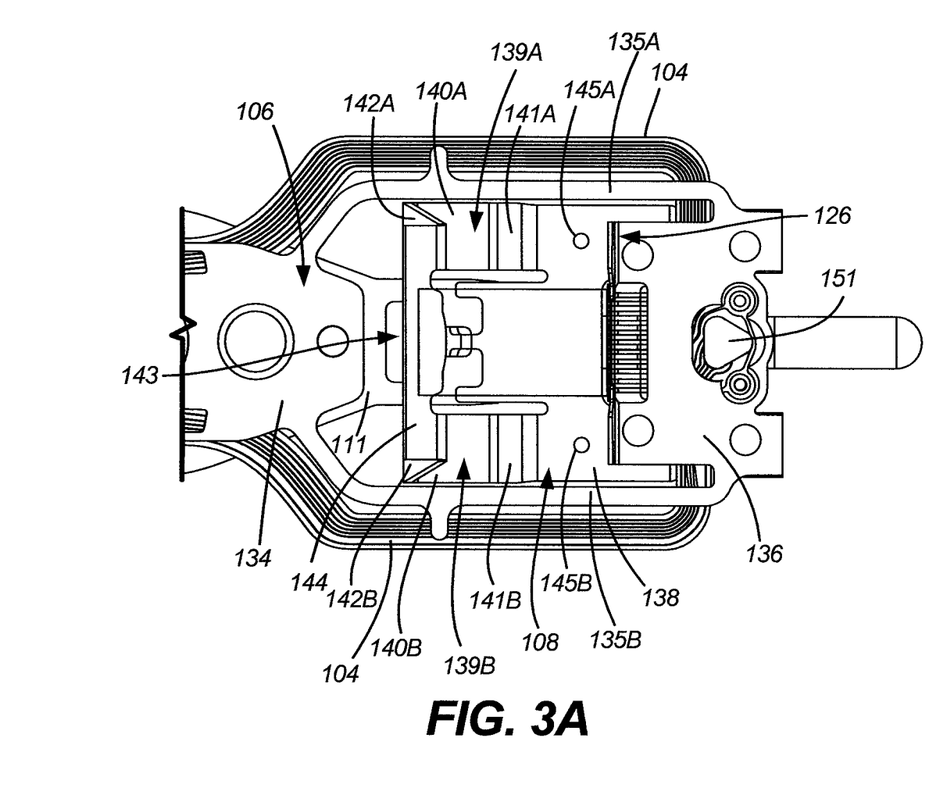
FIG. 3A is a top view of a portion of the head suspension assembly of FIG. 1 where sliders are releasably attached for testing.

FIG. 3A is a top view of a portion of head suspension assembly 100 where sliders 110 are releasably attached for testing. As noted above, gimbal 106 includes legs 135A and 135B that connect main body 134 to tongue 136. Portions 137 of legs 135A and 135B are designed to improve gimbal 106 stiffness. As can be seen in FIG. 3A, portions of traces 125A-125K of electrical interconnect 104 extend along sides of gimbal legs 135A and 135B. A jumper 151 is included for the interleaving of traces. In the embodiment of FIG. 3A, jumper 151 includes 3 vias (not shown in the interest of simplification) that electrically couple to structures 131A-131C, thereby connecting trace 125A to trace portions 125A' and 125A". Clamp 108 includes a substantially flat plate 138 and substantially U-shaped portions 139A and 139B extending from the substantially flat plate 138. When assembled in a manner shown in FIG. 3A, the substantially flat plate 138 is above beam 111 and the U-shaped portions 139A and 139B are positioned on either side of beam 111. Each U-shaped portion 139A, 139B includes a base 140A, 140B, a first side 141A, 141B connected to substantially flat plate 138 and a second side 142A, 142B that is opposite first side 141A, 141B and may have a height that is greater than a height of first side 141A, 141B. Second sides 142A and 142B of U-shaped portions 139A and 139B, respectively, are coupled together by a connection piece 143 that includes a tab or clamp tip 144. The substantially flat plate 138 includes fiducial holes 145A and 145B positioned as shown in FIG. 3A. As will be discussed below, fiducial holes 145A and 145B serve as positioning or alignment features. Any other suitable alignment features (e.g., fiducial marks) may be used instead of fiducial holes 145A and 145B in other embodiments. In should be noted that fiducial holes 145A and 145B are aligned with holes in interconnect structures 132A and 132B, respectively, shown in FIG. 2E. Clamp 108 is formed of a resilient material (e.g., resilient sheet steel) that enables loading/unloading of slider 110 into head suspension assembly 100 and also helps hold the slider 110 in place in head suspension assembly 100 by urging the slider 110 against stopper 126 of gimbal 106. Slider 110 may be loaded into head suspension assembly 100 with the help of a machine that may include, for example, a camera that helps locate fiducial holes 145A and 145B. Once the fiducial holes 145A and 145B are located, the machine calculates a proper location for slider 110 to be loaded, suitably positions slider 110 over clamp 108, and deforms the clamp 108 (e.g., by inserting pins between the U-shaped portions 139A and 139B from below the clamp 108 and applying a force on connection piece 143) such that connection piece 143 and second sides 142A and 142B are pulled away from first sides 141A and 141B to enable insertion of slider 110 into the clamp 108. The machine then inserts the slider 110 into the clamp 108 with the slider pads 123A-123K facing the trace contact pads 124A-124K.

Figure 3B:
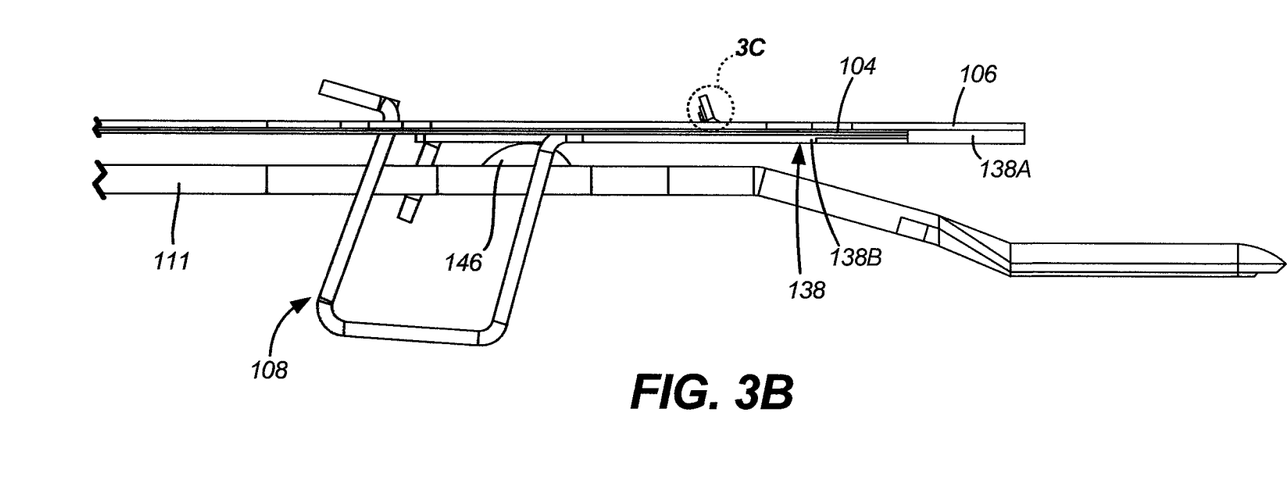
FIG. 3B is a side view of the head suspension assembly portion shown in FIG. 3A.

FIG. 3B is a side view of the head suspension assembly 100 portion shown in FIG. 3A. As can be seen in FIG. 3B, substantially flat plate 138 of clamp 108 includes a first thickness portion 138A that is attached (e.g., bonded) to gimbal 106 and a second, reduced thickness, portion 138B. The second reduced thickness portion 138B provides a space for inclusion of portions of traces 125A-125K of electrical interconnect 104 between gimbal 106 and clamp 108. As can be seen in FIG. 3B, clamp 108 is in contact with a raised portion 146 of beam 111.

Figure 3C:
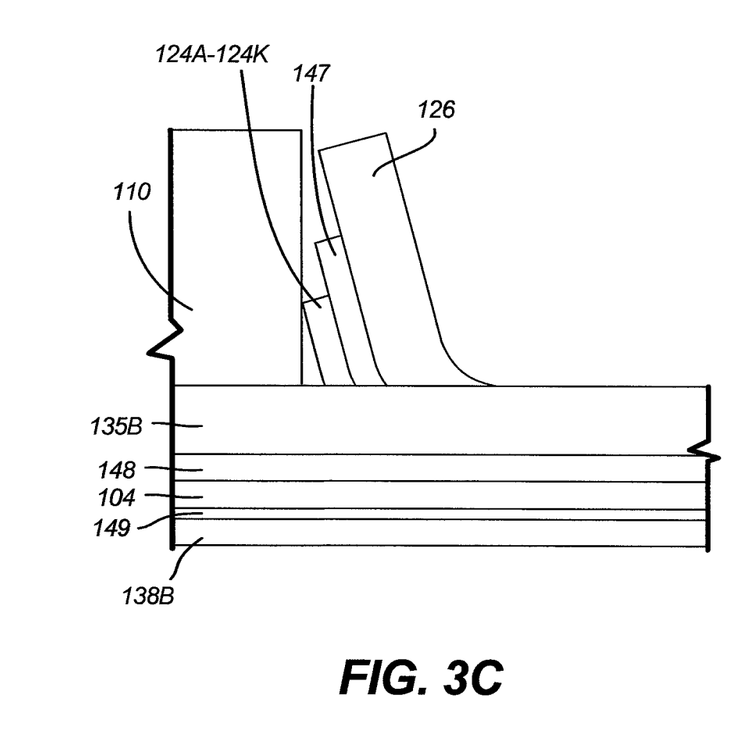
FIG. 3C is an exploded view of a portion of the structure shown in FIG. 3B.

FIG. 3C is an exploded view of a portion of the structure shown in FIG. 3B. As can be seen in FIG. 3C, a first intermediate layer 147 is included between trace contact pads 124A-124K and stopper 126 of gimbal 106. In one embodiment, the first intermediate layer 147 may be formed of a flexible material (e.g., polyimide) and may be about 10 micrometers (um) thick. It should be noted that, in the interest of simplification, layer 147 is not shown in certain figures (e.g., not shown in FIG. 3A). Gimbal leg 135B, which is seen in the side view of FIG. 3C, may be about 25 um thick in one embodiment. A second intermediate layer 148 is included between gimbal 106 and electrical interconnect 104. As in the case of the first intermediate layer 147, in one embodiment, the second intermediate layer 148 may be formed of a flexible material (e.g., polyimide) and may be about 10 um thick. Electrical interconnect portion 104 below second intermediate layer 148 includes portions of traces 125A-125K, which may be formed of any suitable electrically conductive material. In embodiment, the electrical interconnect portion 104 below the second intermediate layer 148 includes copper and is about 10 um thick. A cover layer 149, which may be about 4 um thick in one embodiment, is below the electrical interconnect portion 104. The side view of FIG. 3C also shows portion 138B of substantially flat plate 138 of clamp 108.

Figures 4A, 4B, 4C:
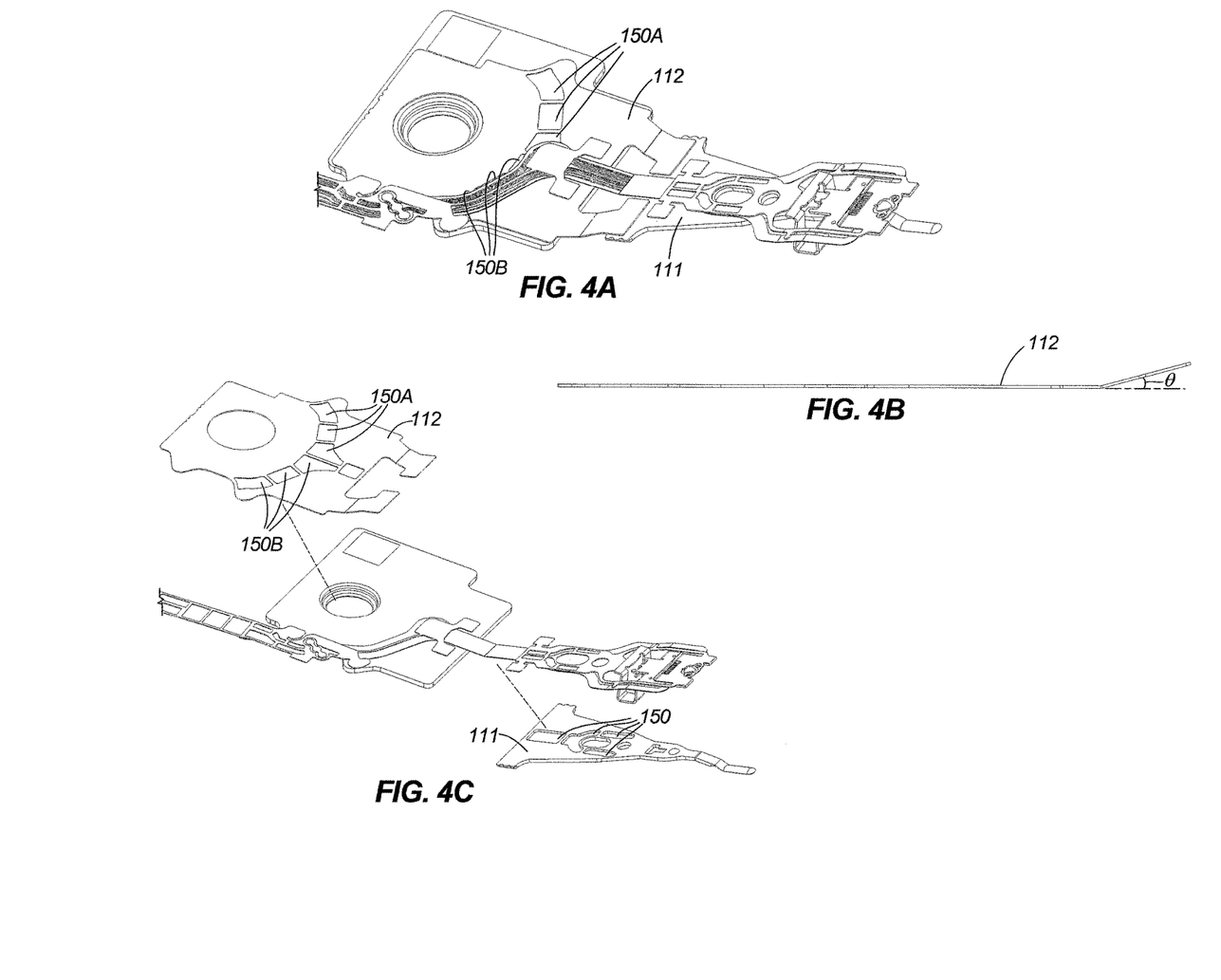
FIGS. 4A-4C are diagrammatic illustrations of a load beam assembly including reduced thickness regions in accordance with one embodiment.

FIGS. 4A-4C are diagrammatic illustrations of load beam assembly 102 having beam 111 and hinge 112 with reduced (non-zero) thickness regions 150, 150A and 150B, which are configured to provide an improvement in electrical bandwidth. The reduced thickness regions 150, 150A and 150B are included to help reduce/limit contact between electrical interconnect 104 and load beam assembly 102 (e.g., beam 111 and hinge 112), thereby reducing an influence of a material of the load beam assembly 102 (e.g., stainless steel) on a flow of electrical current through the interconnect 104, which results in a bandwidth improvement. Accordingly, the reduced thickness regions 150, 150A and 150B of beam 111 and hinge 112 are included below the electrical interconnect 104 and generally have shapes that correspond to shapes of portions of the electrical interconnect 104 that are above the reduced thickness regions 150, 150A and 150B. The shapes of the reduced thickness regions 150 include substantially rectangular shaped regions, a substantially Y-shaped region and other suitable shapes. The two sets of reduced thickness regions 150A and 150B of hinge 112 are substantially similar. The inclusion of such substantially similar reduced thickness regions 150A and 150B is to provide an option for routing electrical interconnect 104 over either region 150A or over region 150B. In some embodiments, the reduced thickness regions 150, 150A and 150B may be formed by an etching process. In one embodiment, legs of hinge 112 have a free-state angle θ of about 13 degrees, which is shown in the hinge 112 side view of FIG. 4B. The angled hinge 112 portion helps bias beam 111 towards a data storage medium for testing slider 110.

Figure 5:
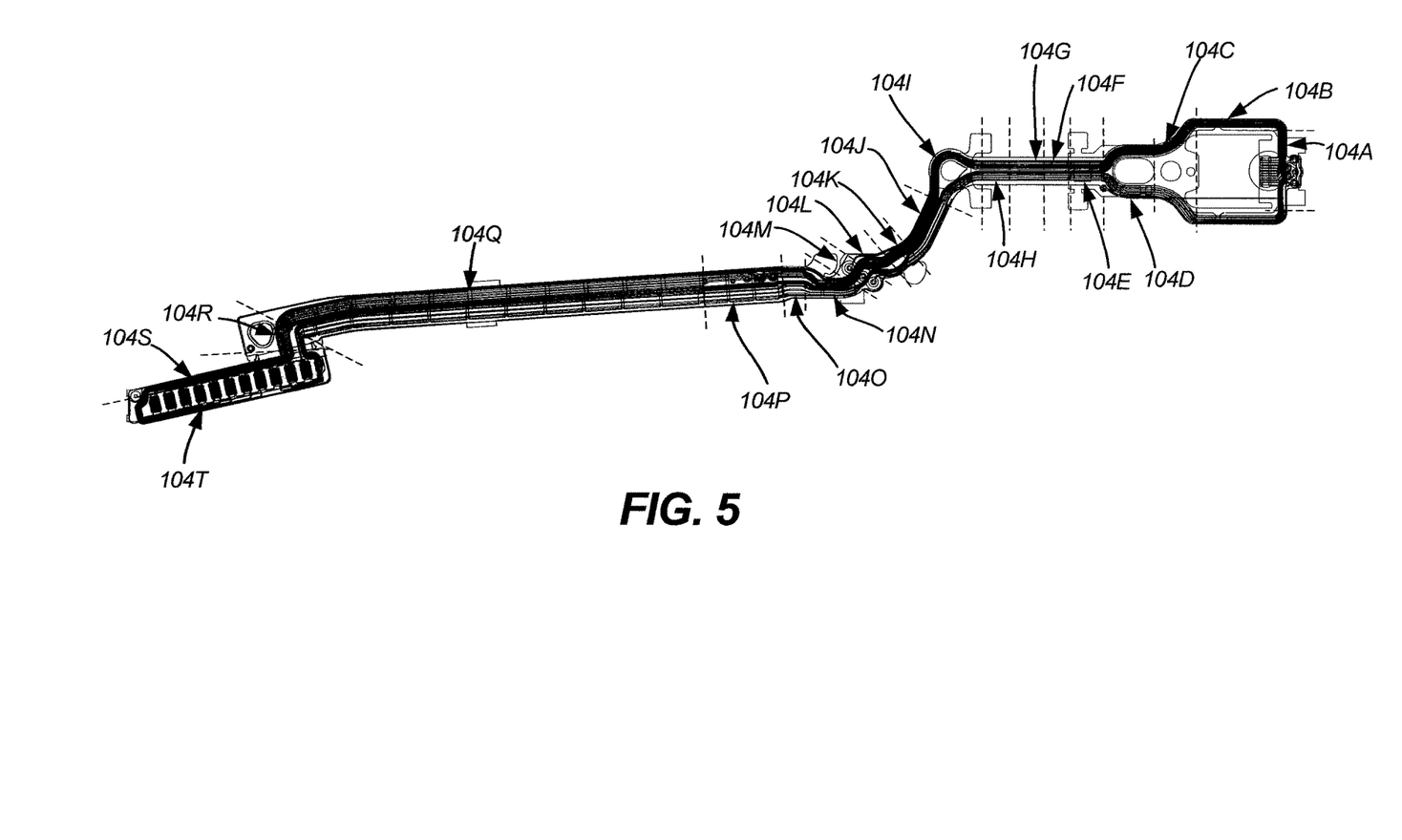
FIG. 5 is a diagrammatic illustration of an electrical interconnect in accordance with one embodiment.

FIG. 5 is a diagrammatic illustration of electrical interconnect 104 in accordance with one embodiment. In the embodiment of FIG. 5, different portions of electrical interconnect 104 have independently determined trace widths and inter-trace spacing to provide bandwidth improvements. In the embodiment of FIG. 5, electrical interconnect 104 includes a pre-gimbal trace portion 104A, a gimbal trace portion 104B, first load beam trace portion 104C, a second load beam trace portion 104D, a third load beam trace portion 104E, a fourth load beam trace portion 104F, a fifth load beam trace portion 104G, a sixth load beam trace portion 104H, a first pre-load trace portion 104I, a second pre-load trace portion 104J, a third pre-load trace portion 104K, a first weld trace portion 104L, a second weld trace portion 104M, a third weld trace portion 104N, a fourth weld trace portion 104O, a fifth weld trace portion 104P, a tail trace portion 104Q, a first tail bend trace portion 104R, a second tail bend trace portion 104S and a third tail bend trace portion 104T. As noted above, in some embodiments, each of the different electrical interconnect portions 104A-104T may have differing trace widths and/or inter-trace spacing. For example, trace 125D (shown in FIG. 2E) may have a first width in pre-gimbal region 104A and a second width in gimbal region 104B, with the second width being different from the first width. Also, for example, a first inter-trace spacing between traces 125D and 125E (shown in FIG. 2E) in pre-gimbal region 104A may be different from a second inter-trace spacing between the same traces 125D and 125E in gimbal region 104B.

Figure 6A:
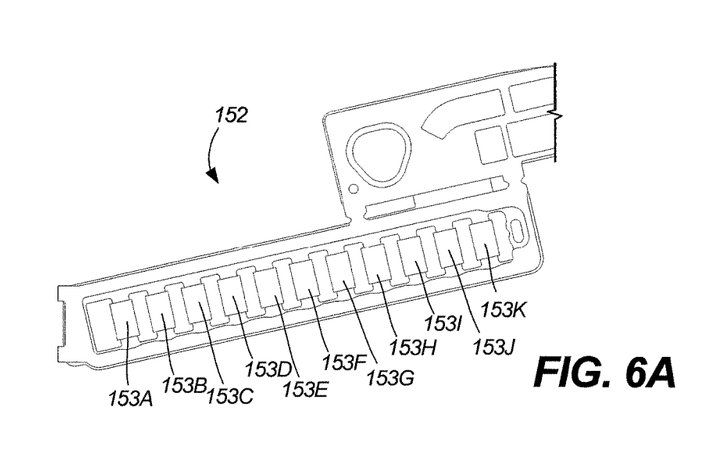
FIGS. 6A and 6B are diagrammatic illustrations that together illustrate a tail pad design for the head suspension assembly of FIG. 1 in accordance with one embodiment.
Figure 6B:
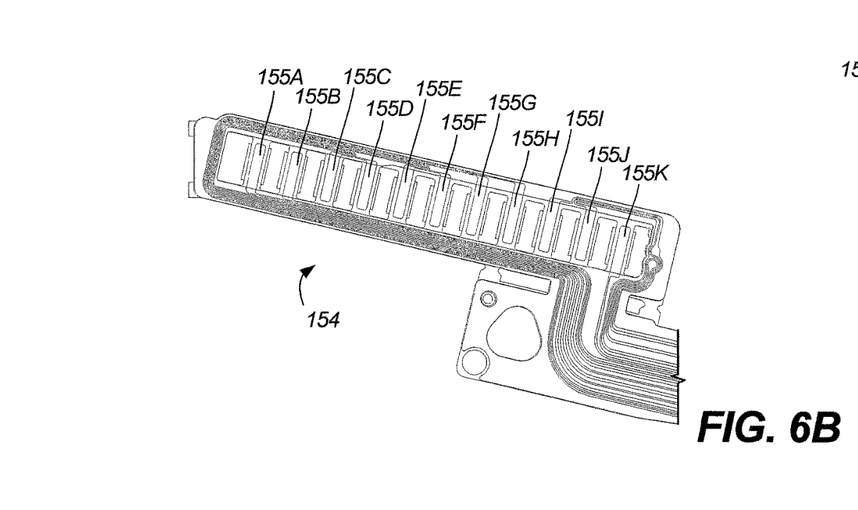

FIGS. 6A and 6B illustrate a tail pad design for head suspension assembly 100 in accordance with one embodiment. FIG. 6A illustrates a first portion 152 of a tail end 122 (shown in FIG. 1) of head suspension assembly 100. First portion 152 may be formed of a metal such a stainless steel and includes islands 153A-153K. FIG. 6B illustrates a second portion 154 of the tail end 122 of head suspension assembly 100. The second portion 154 of the tail end 122 includes pads 155A-155K. In the embodiment of FIG. 6B, the tail pads include a writer negative pad (W−) 155A, a writer positive tail pad (W+) 155B, a heater for reader tail pad (Hr) 155C, a heater for writer pad (Hw) 155D, a first reader negative tail pad (R1−) 155E, a first reader positive tail pad (R1+) 155F, a second reader negative tail pad (R2−) 155G, a second reader positive tail pad (R2+) 155H, a first thermal asperity detection tail pad (Tax) 155I, and a second thermal asperity detection pad (Tay) 155J. Tail pad 155K is a microactuator pad, which is coupled to a microactuator (not shown) via a trace. In an assembled state, different ones of tail of pads 155A-155K are located over corresponding ones of islands 153A-153K.

Figure 6C:
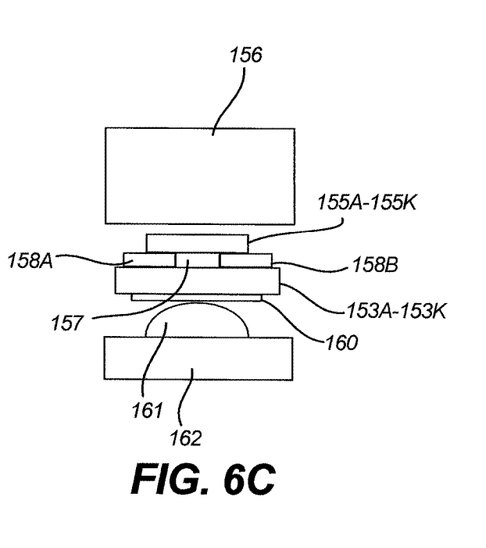
FIG. 6C illustrates a reflow process for coupling the tail pad portions of FIGS. 6A and 6B to a printed circuit card.

FIG. 6C is a diagrammatic illustration of a reflow process for electrically coupling a tail pad to a printed circuit card (PCC) 162. A heat source (e.g., a reflow tip of a hot bar) 156 is positioned above the layered structure as shown in FIG. 6C. The tail pad 155A-155K is directly above an electrically conductive via 157. The tail pad 155A-155K may be about 10 um thick and the via 157 may have a similar thickness. In one embodiment, tail pads 155A-155K and conductive via 157 may be formed of Cu. As can be seen in FIG. 6C, the via 157 is flanked by substantially coplanar intermediate layers 158A and 158B. In one embodiment, the intermediate layers 158A and 158B may be formed of a flexible material (e.g., polyimide) and may be about 10 um thick. An island 153A-153K is included below the electrically conductive via 157 and the intermediate layers 158A and 158B. In one embodiment, the island 153A-153K may be formed of stainless steel and may be about 25 um thick. A metal layer 160 is positioned below the island 153A-153K. In some embodiments, the metal layer 160 is formed of a different metal than the island 153A-153K. In one embodiment, the metal layer 160 is formed of gold and is about 0.0025 um thick. The gold layer 160 enables stainless steel island 153A-153K to connect to a solder bump 162 on PCC 162. Heat from reflow tip 156 is passed to one pad 15A-155K and transferred to the island 153A-153K through via 157. The heat from the island 153A-153K is transferred to the solder bump 161 via the thin metal layer 160. The solder bump 161 melts to form the electrical connection to the PCC 162.

Figure 7:
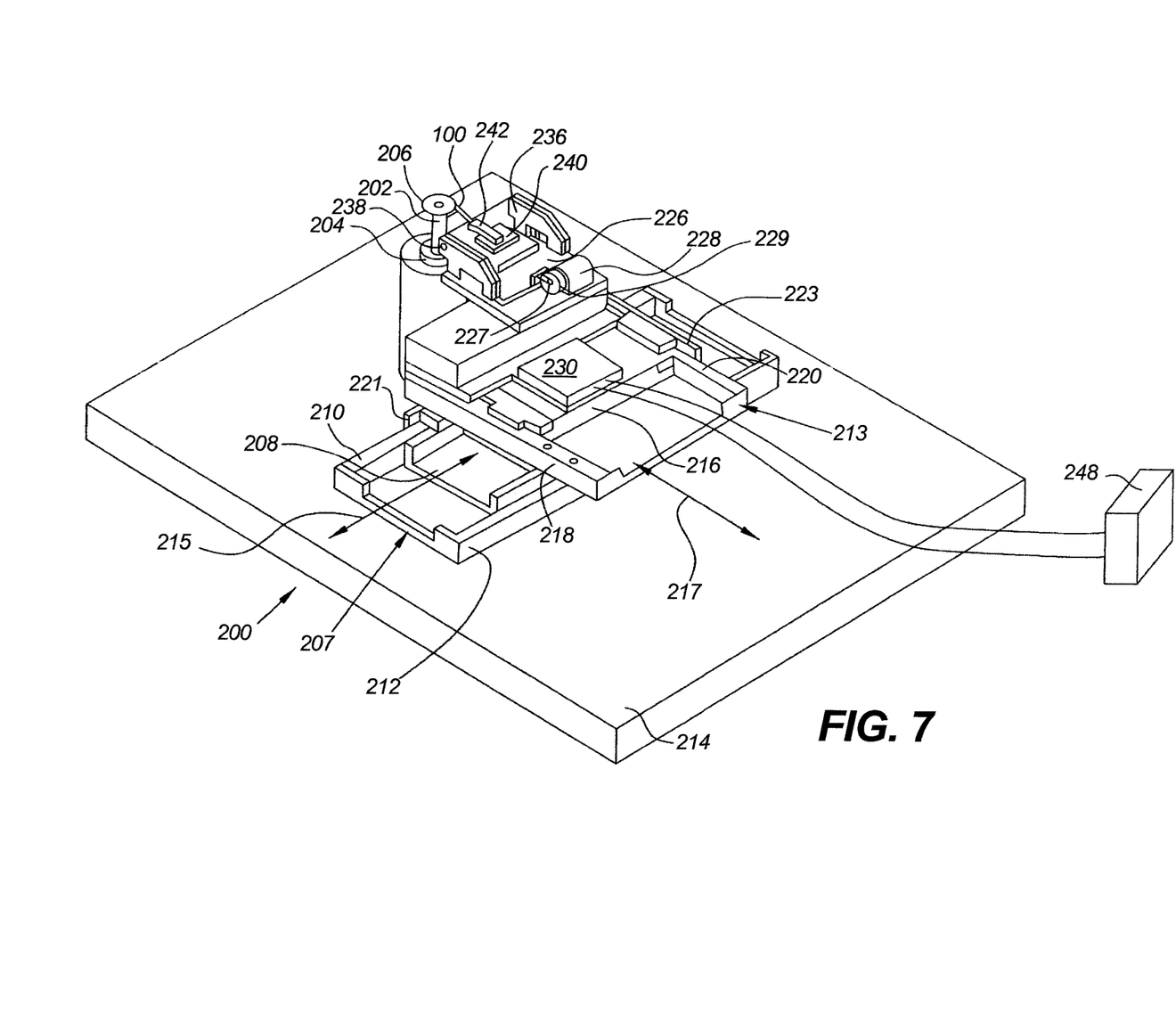
FIG. 7 is a perspective view of an example of a slider tester which incorporates the head suspension assembly of FIG. 1.

FIG. 7 is a perspective view of an example of a slider tester which incorporates head suspension assembly 100. Slider tester 200 includes disc 206 mounted on spindle 202, which is rotated by spindle motor 204. Spindle motor 204 rests on base 214 located directly below platform 208. Base 214 typically includes a heavy granite block to provide mechanical stability. Head suspension assembly 100 is positioned over disc 206 by "X" direction positioning mechanism 207 and "Y" direction positioning mechanism 213. "X" positioning mechanism 207 includes platform 208 which moves between guide rails 210 and 212. For purposes of reference, movement of platform 208 along guides 210 and 212 is considered to be in the "X" direction as shown by arrows 215. "Y" positioning mechanism 213 includes a carriage 216 that moves between rails 218 and 220 in the "Y" direction as indicated by arrows 217.

Platform 208 can be supported by a cushion of air during movement, and can be stabilized in a particular position by the application of a vacuum between platform 208 and granite base 214 located directly below platform 208. Similar to platform 208, carriage 216 can be supported by a cushion of air during movement and locked into position by application of a vacuum. Position encoders 221 and 223 can be located, respectively, along guide 210 to provide an indication of the position of platform 208 and along guide 220 to provide an indication of the position of carriage 216.

Carriage 216 and platform 208 may be actuated by servo motors or stepper motors mounted between one of the guide rails and the respective platform or carriage. Other types of motors, such as linear motors with the magnetic actuating structure built into the guide rails and platforms, may be used. These motors generally perform coarse adjustment of head suspension assembly 100 which is connected to a suspension chuck 242. Suspension chuck 242 may be mounted to fine positioning platform 240. Fine positioning platform 240 is connected to suspension chuck 242 through piezo elements or a voice coil actuator or other mechanism that is able to move suspension chuck 242 in the X direction to perform fine adjustment of a transducing head with respect to disc 106.

During head suspension loading operations, pivot motor 228 rotates eccentric cam 229 causing lever arm 227 and the back end of pivoting platform 226 to rotate upward about pivot pins 236, 238. Suspension chuck 242, which carries suspension 244, is then placed on piezo platform 240 and spindle motor 204 is activated so that disc 206 rotates at a desired speed. Carriage 216 can be moved forward so that the slider 110 (FIGS. 1 and 2A) at the end of suspension 100 moves under the spinning disc 206. Support platform 208 is also moved so that slider 110 is positioned at a desired radius along disc 206. When the slider 110 nears the desired location relative to disc 206, motor 228 rotates eccentric cam 229 back so that pivoting platform 226 returns to its level position and the head is brought into proximity with disc 206. The head suspension 100 then flies over a surface of disc 206. If fine positioning platform 240 is not included, suspension chuck 242 may be mounted directly on pivoting platform 226.

The head suspension 100 is connected by electrical leads to printed circuit 230, which has further connections to control box 248. Control box 248 controls the positioning of the head suspension 100 and the types of tests that are performed on the slider 110. In particular, control box 248 designates the location for the test track, the data to be written to the disc, and the position of the read head within the written track during read back of the test data. Using fine positioning platform 240, the slider 110 can be moved to a number of different locations within a track during read back, so that a profile of the off track sensitivity of the read element of slider 110 can be determined.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A head suspension assembly comprising:
a load beam assembly;
a gimbal coupled to the load beam assembly, the gimbal comprising a stopper; and
a clamp coupled to the gimbal, the clamp configured to releasably secure a slider in the head suspension assembly and configured to urge the slider towards the stopper,
the clamp comprising:
a plate;
an alignment feature in the plate for positioning the slider in the head suspension assembly;
first and second side members coupled to the plate, the first and second side members each include a portion that extends downwardly from the plate and a portion that is above the plate; and
a connection piece, above the plate, that connects the first and second side members.

2. The head suspension assembly of claim 1 and wherein the alignment feature comprises fiducial holes.

3. The head suspension assembly of claim 1 and further comprising an electrical interconnect configured to couple to the slider when the slider is secured in the head suspension assembly.

4. The head suspension assembly of claim 3 and wherein portions of the electrical interconnect are routed over the load beam assembly.

5. The head suspension assembly of claim 4 and further comprising reduced thickness regions in portions of the load beam assembly under the electrical interconnect.

6. The head suspension assembly of claim 4 and wherein the load beam assembly includes a first end and a second end that is proximate to the clamp, and wherein the electrical interconnect comprises a tail pad portion that extends beyond the first end of the load beam assembly, and the tail pad portion comprises a plurality of layers comprising:
an electrically conductive via;
a first metal layer below the electrically conductive via; and
a second metal layer below the first metal layer and formed of a different metal than the first metal layer.

7. The head suspension assembly of claim 1 and wherein the electrical interconnect comprises traces coupled to contact pads, and wherein the clamp is configured to urge the slider against the contact pads.

8. The head suspension assembly of claim 7 and wherein the gimbal comprises the stopper that is configured to prevent movement of the contact pads when the slider is urged against the contact pads.

9. The head suspension assembly of claim 8 and wherein the stopper comprises a first finger that is positioned proximate to a first outer contact pad of the contact pads, and wherein the stopper further comprises a second finger positioned proximate to a second outer contact pad of the contact pads.

10. The head suspension assembly of claim 9 and wherein the stopper further comprises a first wing coupled to the first finger and a second wing coupled to the second finger.

11. The head suspension assembly of claim 8 and wherein the stopper comprises a bar positioned proximate to the contact pads, and wherein the bar is configured to prevent movement of the contact pads when the slider is urged against the contact pads.

12. An apparatus comprising:
a load beam assembly;
a gimbal coupled to the load beam assembly, the gimbal comprising a substantially flat portion and a stopper having first and second wings that extend upwardly from the substantially flat portion of the gimbal, the stopper further comprising:
a bar between the first and second wings having a different geometry than the first wing or the second wing, the bar having a first end coupled to the first wing and a second end coupled to the second wing; or
a first finger coupled to the first wing and a second finger coupled to the second wing, the first and second fingers being between the first and second wings; and
a clamp coupled to the gimbal, the clamp configured to releasably secure a slider and configured to urge the slider towards the bar or the first and second fingers of the stopper.

13. The apparatus of claim 12 and further comprising an electrical interconnect configured to couple to the slider when the slider is secured in the clamp.

14. The apparatus of claim 13 and wherein the electrical interconnect comprises traces coupled to contact pads, and wherein the clamp is configured to urge the slider against the contact pads.

15. The apparatus of claim 14 and wherein the stopper is configured to prevent movement of the contact pads when the slider is urged against the contact pads.

16. The apparatus of claim 15 and wherein the stopper comprises the first finger that is positioned proximate to a first outer contact pad of the contact pads, and wherein the stopper further comprises the second finger positioned proximate to a second outer contact pad of the contact pads.

17. The apparatus of claim 14 and wherein the stopper comprises the bar positioned proximate to the contact pads, and wherein the bar is configured to prevent movement of the contact pads when the slider is urged against the contact pads.

18. A method of making a head suspension assembly comprising:
providing a load beam assembly;
coupling a gimbal having a stopper to the load beam assembly;
coupling a clamp to the gimbal such that a plate of the clamp is attached to the gimbal and located between the gimbal and the load beam assembly, and such that side members of the clamp that extend downwardly from the plate are positioned on left and right sides of the load beam assembly, the clamp being capable of releasably securing a slider in the head suspension assembly and being capable of urging the slider towards the stopper; and providing an alignment feature in the clamp for positioning the slider in the head suspension assembly.

19. The method of claim 18 and further comprising providing an electrical interconnect configured to couple to the slider when the slider is secured in the head suspension assembly.

20. The method of claim 19 and further comprising routing portions of the electrical interconnect over the load beam assembly.

* * * * *